(12) United States Patent
Clark (10) Patent No.: US 9,643,669 B1
(45) Date of Patent: May 9, 2017

(54) ATTACHABLE LATERALLY-STABLE RANGE EXTENDER FOR AN ELECTRIC VEHICLE (71) Applicant: Donald P. Clark, Tucson, AZ (US)

(72) Inventor: Donald P. Clark, Tucson, AZ (US)

( * ) Notice: Subject to any disclaimer, the term of this patent is extended or adjusted under 35 U.S.C. 154(b) by 0 days.

(21) Appl. No.: 14/818,656

(22) Filed: Aug. 5, 2015

(51) Int. Cl.
B60B 7/00 (2006.01)
B62D 61/06 (2006.01)
B62B 5/06 (2006.01)
B60L 11/18 (2006.01)
B60D 1/07 (2006.01)

(52) U.S. Cl.
CPC ............. B62D 61/06 (2013.01); B60D 1/07 (2013.01); B60L 11/1801 (2013.01); B62B 5/06 (2013.01)

(58) Field of Classification Search
CPC .......... B62D 61/06; B62D 17/07; B60B 7/00; B60B 9/00; B60B 1/00; B60B 3/00; B60B 5/00
See application file for complete search history.

(56) References Cited

U.S. PATENT DOCUMENTS

| 3,000,652 | A | * | 9/1961 | Hawkins | B60D 1/182 267/293 |
| 3,410,571 | A | * | 11/1968 | Bishop | B62D 13/04 280/103 |
| 3,419,285 | A | * | 12/1968 | Morehouse | B60D 1/54 280/446.1 |
| 3,461,264 | A | * | 8/1969 | Sims | B23K 9/0284 219/160 |
| 3,640,192 | A | * | 2/1972 | Mauldin | E01C 19/266 280/43.23 |
| 3,690,397 | A | * | 9/1972 | Parker | B60K 1/04 180/19.1 |
| 4,266,795 | A | * | 5/1981 | Walker | B66F 9/07563 280/402 |
| 4,438,945 | A | * | 3/1984 | Curtis | B60D 1/52 280/491.5 |
| 5,029,740 | A | * | 7/1991 | Cox | B61D 47/00 280/415.1 |
| 5,727,642 | A | * | 3/1998 | Abbott | A63B 71/0009 280/304.1 |
| 5,738,261 | A | * | 4/1998 | Dula | B60R 9/06 224/282 |
| 6,029,312 | A | * | 2/2000 | Whitney | A01G 1/125 15/347 |
| 6,073,942 | A | * | 6/2000 | Heneveld, Sr. | B62B 5/00 280/33.991 |
| 6,371,498 | B2 | * | 4/2002 | Lundh | 16/44 |
| 6,478,203 | B2 | * | 11/2002 | Burns | B60R 9/065 206/315.3 |
| 6,485,243 | B1 | * | 11/2002 | Ferman | B60R 9/06 224/520 |
| 6,502,847 | B1 | * | 1/2003 | Greaves | B60D 1/00 280/491.1 |
| 6,698,770 | B2 | * | 3/2004 | Eriksson | A61G 12/001 280/33.991 |

(Continued)

OTHER PUBLICATIONS

Undated images (5 pgs).

Primary Examiner — Hau Phan
(74) Attorney, Agent, or Firm — Hayes Soloway P.C.

(57) ABSTRACT

A system for dual-attachment of a trailer to a vehicle by either manually or robotically so that the trailer becomes a laterally-stable extension of the vehicle.

12 Claims, 8 Drawing Sheets (56) References Cited

U.S. PATENT DOCUMENTS

| | | | | |
|---|---|---|---|---|
| 6,715,774 B2* | 4/2004 | Cassoni | ............... | A63B 55/08 |
| | | | | 224/274 |
| 6,729,114 B2* | 5/2004 | Fillman | ............... | A01D 34/58 |
| | | | | 180/65.1 |
| 6,739,604 B2* | 5/2004 | Cassoni | ............... | A63B 55/08 |
| | | | | 224/274 |
| 6,764,092 B1* | 7/2004 | Greaves, Jr. | ............ | B60D 1/00 |
| | | | | 280/402 |
| 7,341,417 B1* | 3/2008 | Lohr | ............... | B60R 9/06 |
| | | | | 224/506 |
| 7,641,235 B1* | 1/2010 | Anduss | ............... | B60R 9/06 |
| | | | | 280/47.34 |
| 7,984,916 B2* | 7/2011 | Schwager | ............... | F16D 49/00 |
| | | | | 280/62 |
| 8,132,997 B2* | 3/2012 | Reuille | ............... | B60P 1/4421 |
| | | | | 224/537 |
| 8,162,192 B1* | 4/2012 | Sanchez | ............... | B60D 1/155 |
| | | | | 224/521 |
| 8,833,788 B2* | 9/2014 | Chaddock | ............. | B62D 53/02 |
| | | | | 280/414.5 |
| 2012/0298435 A1 | 11/2012 | Jaffrezic | ............... | 180/68.5 |

* cited by examiner

ATTACHABLE LATERALLY-STABLE RANGE EXTENDER FOR AN ELECTRIC VEHICLE

BACKGROUND

Field

The present disclosure is disclosure is directed to improvements in trailers for vehicles. The disclosure is particularly applicable to wheeled trailers for carrying range extending systems for electric vehicles and will be described in connection with such utility, although other utilities are contemplated.

Background of the Present Disclosure

Today, the batteries present in electric vehicles have a relatively short range resulting in what is commonly referred to as "range anxiety."

The art also has proposed range extending trailers carrying self-powered charging systems—commonly referred to as "range extenders"—for the batteries of for electric vehicles. However, trailers are inherently maneuverably unstable. Pulling a trailer requires maintaining a smooth pulling geometry between the two vehicles. Any quick changes in speed or direction can cause undesirable reactions in an attached trailer, resulting in sliding and/or jack-knifing, particularly on slippery roads, or driving under windy highway conditions. Additionally, backing up maneuvers, and, aligning and hitching a trailer can be difficult particularly for drivers who only occasionally have a need to trailer, requiring the driver to align the trailer ball and hitch behind the vehicle, below the driver's line of sight. Accordingly, current range extending trailers contain complicated back-up steering mechanisms.

SUMMARY OF THE DISCLOSURE

The present disclosure overcomes the aforesaid and other disadvantages of the prior art, by providing an attachable wheeled trailer that includes an attaching plate that self-aligns to a receiving plate on the vehicle. The trailer has a minimum of three wheels. In use, the trailer is suspended on one or a pair of swiveling wheels. However, the trailer also has a pair of swiveling wheel or wheels normally deployed out of the way when the trailer is hitched to the vehicle. The additional swiveling wheel or wheels support the trailer when the trailer is detached from the vehicle, making the trailer readily maneuverable on the ground.

More particularly, the present disclosure provides a trailer comprising a housing, one or more swiveling suspension wheels, one or more swiveling ground maneuvering wheels, and an attaching plate for engaging with a receiving plate on a vehicle.

In one embodiment, the trailer includes a maneuvering handle, which may be rear mounted or side mounted.

In another embodiment, the attaching plate is sized and shaped to self align in the vehicle receiving plate.

In one embodiment, the trailer comprises two suspension wheels and one ground maneuvering wheel.

In another embodiment, the trailer comprises one suspension wheel and two ground maneuvering wheels.

In still yet another embodiment, the trailer comprises two suspension wheels and two ground maneuvering wheels.

In a preferred embodiment of the disclosure, the trailer comprises a range extending trailer for a battery powered vehicle.

In yet another embodiment, the disclosure provides a trailer having one or more swiveling or non-swiveling suspension wheels, and a pair of hitching tongues with connectors for engaging with a pair of ball hitch connectors on a vehicle. In such embodiment, the trailer optionally may include maneuvering handles on the trailer or on the tongues of the trailer. The trailer may comprise one suspension wheel and two ground maneuvering wheels, two suspension wheels and one ground maneuvering wheel, or two suspension wheels and two ground maneuvering wheels.

In yet another embodiment, the trailer includes, a housing, one or more wheels, and a pair of hitching tongues with ball connectors.

In one embodiment of the disclosure, the range extender attaching plate is able to slideably adjust into position on the vehicle's receiving plate by omni-directional movement of the trailer.

The present disclosure also provides a system for extending the range of a motor vehicle powered by an electric motor, said system comprising a trailer as above described, and one or more rechargeable batteries carried in the trailer, or a self-powered charging system for the batteries of the electric vehicle. In such embodiment, the motor vehicle may be an automobile, a truck, a van or a bus.

In yet another embodiment there is provided a battery pack configured to power a motor vehicle carried on a trailer as above described.

In still yet another embodiment, the disclosure provides a trailer hitch assembly for connecting a trailer to a vehicle, comprising a two ball hitch structure for mounting on a vehicle, and for engaging with two hitching tongues mounted on a trailer.

Finally, the disclosure provides an attaching plate for a trailer compatible with attachment requirements of a vehicle plate dually attached to the trailer. In such embodiment, the structure may include a single receiving plate installed on a vehicle.

BRIEF DESCRIPTION OF THE SEVERAL VIEWS OF THE DRAWINGS

Further features and advantages of the present disclosure shall be seen from the following detailed description, taken in conjunction with the accompanying drawings, wherein like numerals depict like parts, and wherein.

DETAILED DESCRIPTION

Figure 1A:
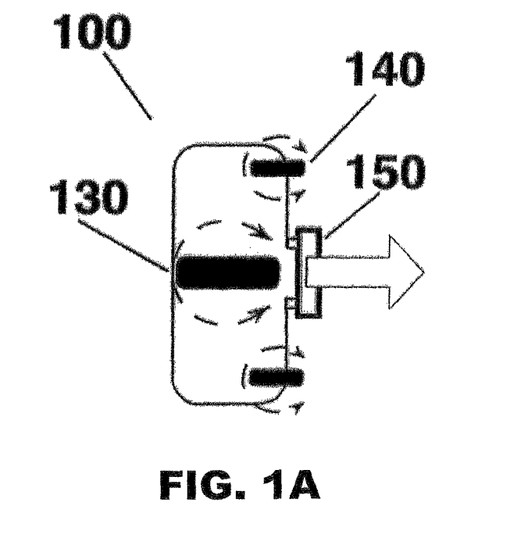
FIGS. 1A and 1B illustrate maneuvering functionality of a three-wheeled range-extending trailer according to the present disclosure.

FIG. 1A is a plan view of a range-extending trailer 100 showing the maneuvering functionality of the vehicle swiveling suspension wheel or wheels 130 and trailer swiveling ground maneuvering wheel or wheels 140. Also shown is dually-attached trailer installing plate 150.

Figure 1B:
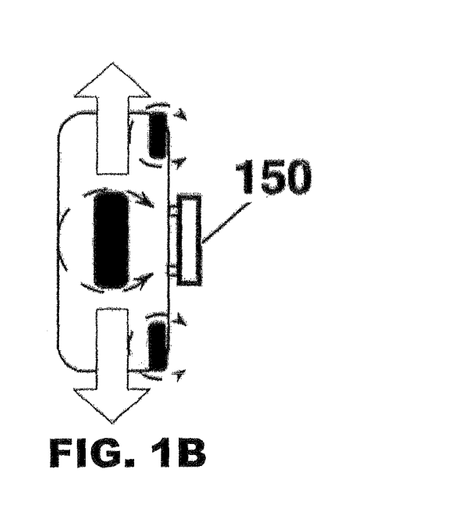

FIG. 1B illustrates how the swiveling wheels 130, 140 permit lateral maneuverability of the range-extending trailer.

Figure 2A:
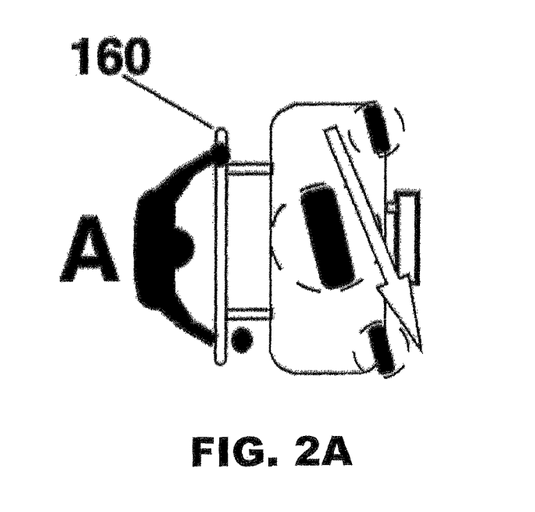
FIGS. 2A and 2B demonstrate the manual maneuverability of the range-extending trailer vehicle by means of two different handle configurations.

FIG. 2A demonstrates manual maneuvering of the range-extending trailer from behind using a rear handle 160.

Figure 2B:
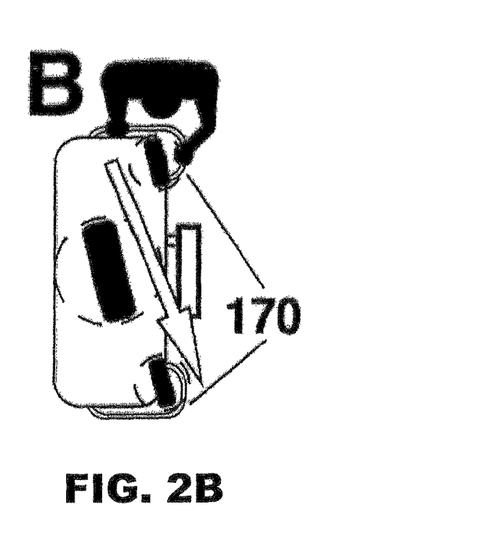

FIG. 2B demonstrates manual maneuvering of the range-extending trailer from a side using a side-front wrapping handle 170.

Figure 3A:
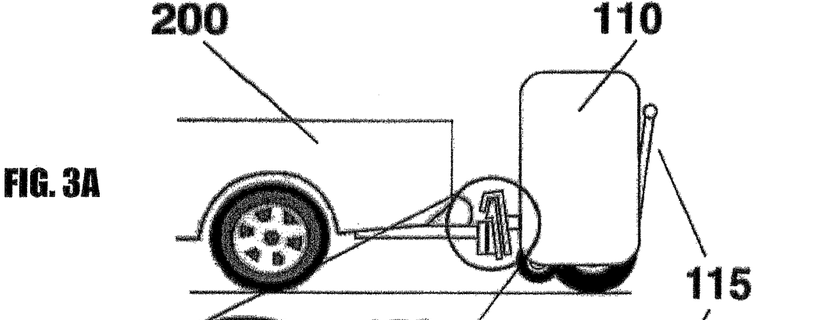
FIGS. 3A-3C demonstrate an alternative swing-away installation system allowing full access to the rear of an attached vehicle.

FIG. 3A is an elevational view of an electric pickup truck 200 that requires full access to its rear end. The same would be true for station wagons and SUVs and delivery vans. Identified are the trailer's housing 110 and deployable rear handle 115.

Figures 3B, 3C:
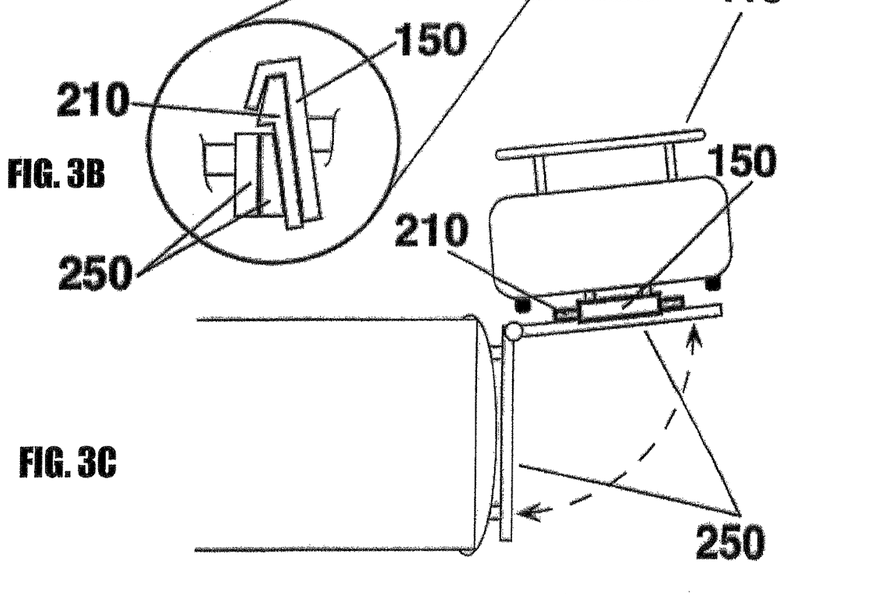

In an expanded view, FIG. 3B, is shown the range-extending trailer's attaching plate 150 and the vehicle's receiving plate 210 installed to vehicle hinged hitch frame 250. The hinged frame 250 features a quick release component (not shown) allowing its two hinged components to be operationally opened.

FIG. 3C is a plan view of the truck with its hinged attachment frame opened so as to locate the attached range-extending trailer off to a side so as to allow full access to the back of the vehicle.

FIGS. 4A-4D demonstrate manual attachment of a range-extending trailer 100 to electric vehicle 200.

Figure 4A:
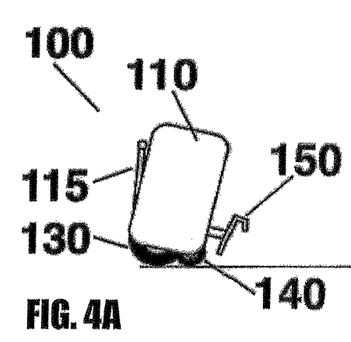
FIGS. 4A-4D demonstrate a manual attachment of the range-extending trailer to a vehicle.

FIG. 4A shows the range-extending trailer 100 sitting on the ground supported on its own three wheels 130, 140. Identified are a swiveling suspension wheel 130, a swiveling ground maneuvering wheel 140, the vehicle's housing 110, deployable rear handle 115 and attaching plate 150.

Figure 4B:
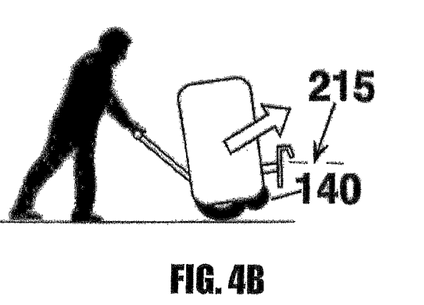

FIG. 4B demonstrates a man raising the front of the range-extending trailer's installing plate above the operational height of a vehicle's receiving plate 215. This action also has elevated maneuvering wheels 140 off the ground.

Figures 4C, 4D:
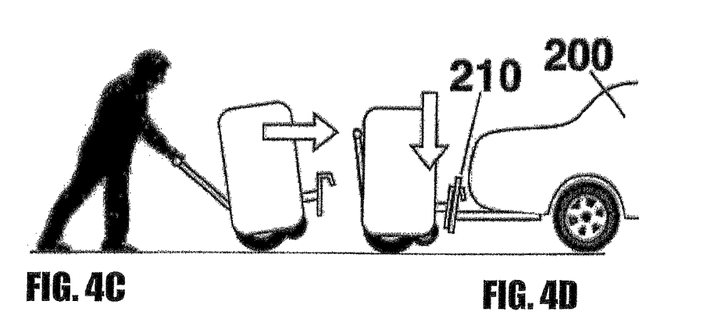

FIG. 4C shows the tilted range-extender trailer's attaching plate arriving over the vehicle's receiving plate.

FIG. 4D demonstrates the installing plate having been lowered onto vehicle receiving plate 210.

Figure 5A:
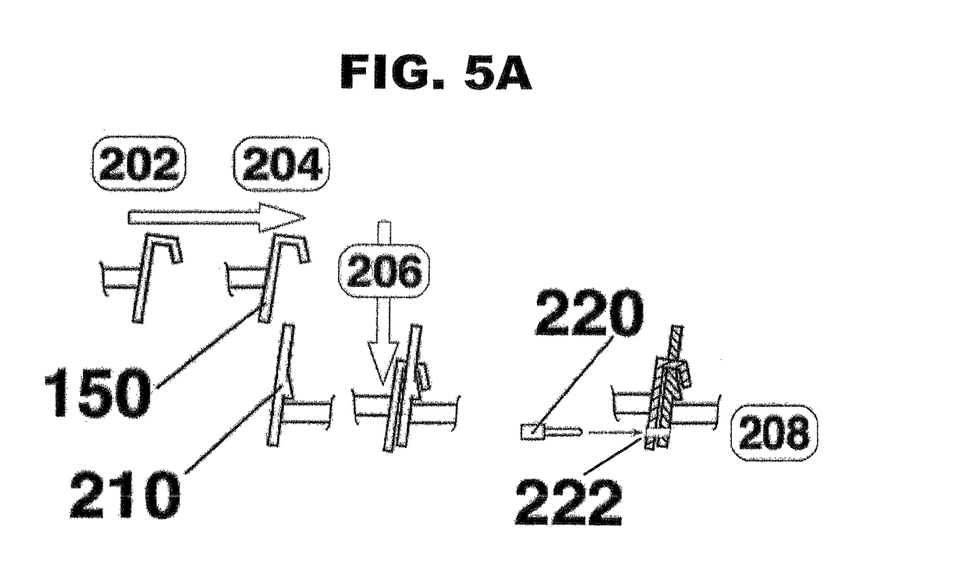
FIG. 5A demonstrates the functionality of a range-extending trailer attaching plate installing to a vehicle receiving plate.

FIG. 5A is an operational schematic of the connecting plates. Range-extender trailer installing plate 150 is positioned at step 202 and moved at step 204 to above its target receiving plate 210 and lowered at step 206 into connection with the receiving plate. Step 208 shows the accomplished connective assembly of the plates. At step 208 a locking pin 220 is installed into aligning holes 222 in the established plates.

Figure 5B:
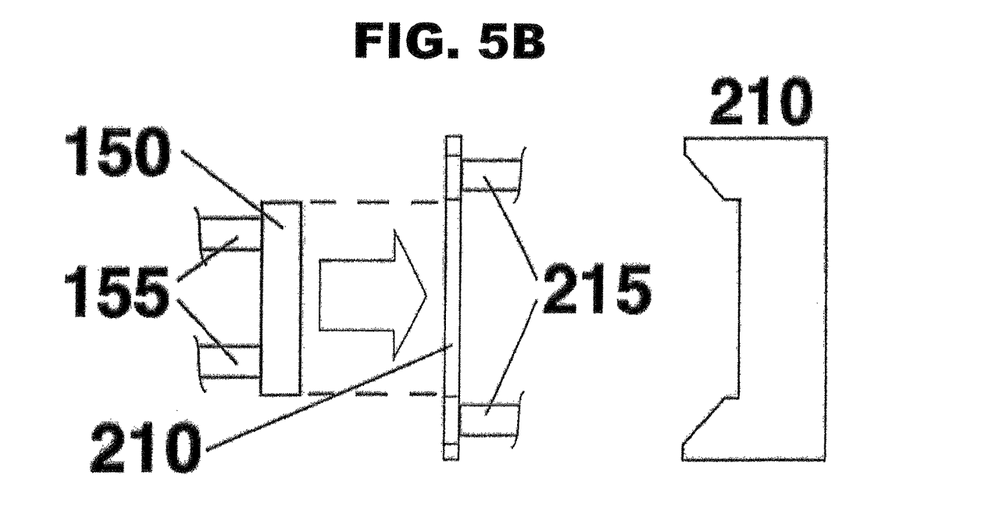
FIG. 5B is a top plan view thereof.

FIG. 5B is a top plan view of the dual-connectivity structure of a range-extending trailer's installing plate 150 arriving to an electric vehicle's receiving plate 210.

Figures 6A, 6B, 6C:
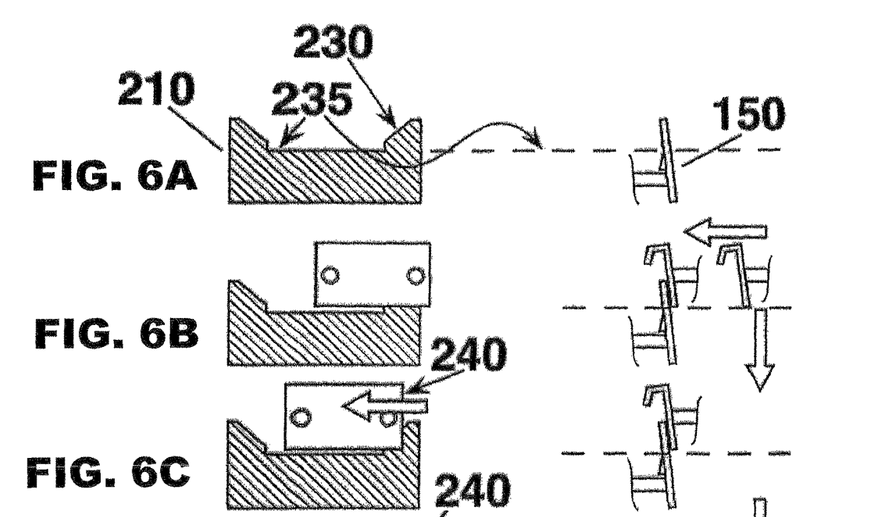
FIGS. 6A-6G demonstrates the lateral and vertical self-aligning functionality of a range-extending trailer attaching plate installing to a vehicle receiving plate.

FIGS. 6A-6F present front and side views and FIG. 6G a top plan view of self-aligning functionality installing plate 150 slidingly installed to vehicle receiving plate 210, as follows:

FIG. 6A is illustrates the receiving plate's alignment edges 230 that will guide the installing plate down into the seating recess, 235.

FIG. 6B illustrates an installing plate making random first contact with the receiving plate 210.

FIG. 6C illustrates the installing plate being laterally slid against the receiving plate until an end edge 290 is above an alignment edge of the receiving plate.

Figure 6D:
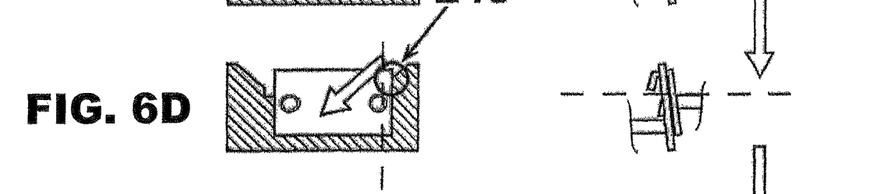

FIG. 6D illustrates the installing plate's indicated guiding edge being slid down an alignment edge of a receiving plate.

Figure 6E:
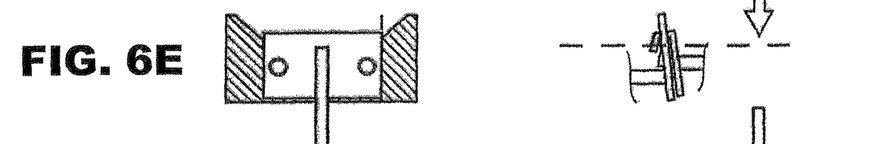

FIG. 6E illustrates the installing plate free of the bottom of the alignment plate edge and so over the receiving plate's seating recess 235.

Figure 6F:
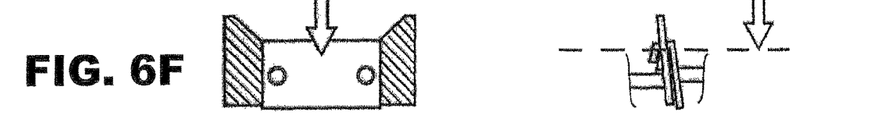

FIG. 6F illustrates the installing plate being lowered down into operational connection with the receiving plate.

Figure 6G:
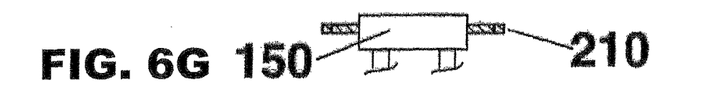

FIG. 6G is a top plan view of the accomplished connective assembly of trailer installing plate 150 and a vehicle receiving plate 210.

By virtue of the disclosure that has just been described it is a simple and straight forward exercise for a user to attach a swiveling-wheeled range-extending trailer to an electric vehicle, thus significantly extending the range of the vehicle. Moreover, unlike conventional single ball-mounted trailers, being dually-attached to the vehicle, and by virtue of the swiveling ground maneuvering wheel or wheels, the trailer will effortlessly track movement with the vehicle when backing up as a laterally-stable extension of the vehicle.

The disclosure in particular allows users of electric vehicles to simply and rapidly attach a range-extending trailer to an electric vehicle. The range-extending trailers may be privately owned, i.e. by the vehicle owner, or alternatively can be rented from central depots when a long trip is planned. Also, since the range-extending trailers may be provided with a universal standard attaching plate, and electric vehicles with a universal receiving plate, it will be a simple matter to attach or swap out a range-extending trailer at a central depot in a matter of minutes. The attachment system allows both manual and robotic attachment of the trailer to a suitably equipped vehicle.

Various changes may be made in the above disclosure without departing from the spirit and scope thereof.

Figure 7A:
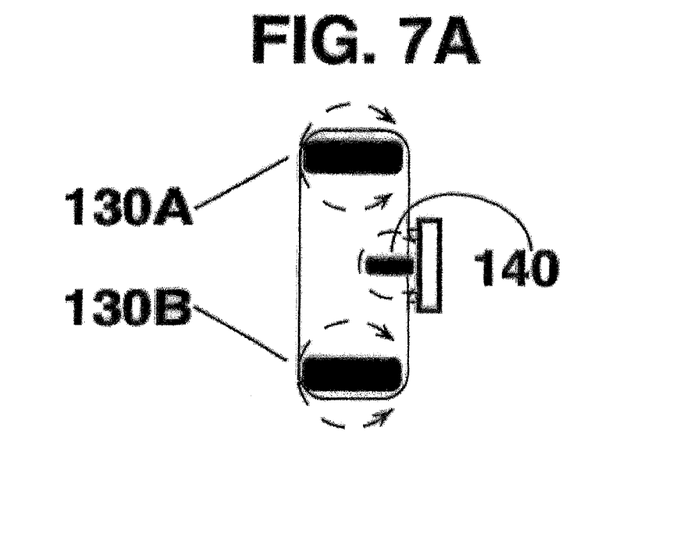
FIGS. 7A and 7B illustrate two alternative embodiments of a range-extending trailer of the present disclosure.
Figure 7B:
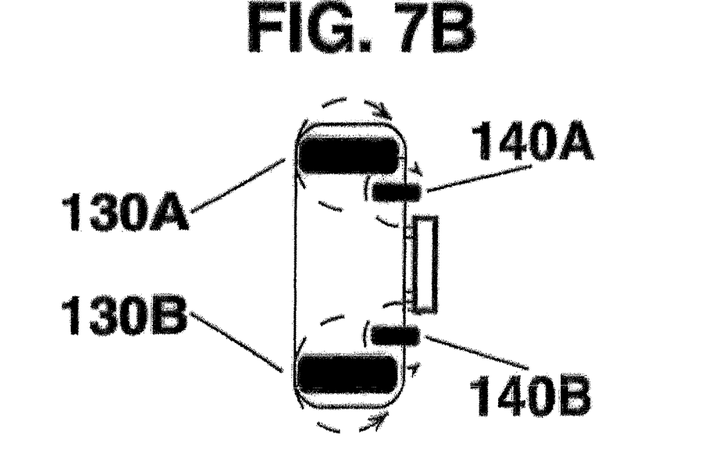

FIGS. 7A and 7B illustrate two alternative embodiments. In FIG. 7A, the range-extending trailer has two swiveling suspension wheels 130A, 130B, and a single swiveling ground maneuvering wheel 140. In FIG. 7B, the trailer has two swiveling suspension wheels 130A, 130B and two swiveling ground maneuvering wheels 140A, 140B.

Figures 8A, 8B, 8C:
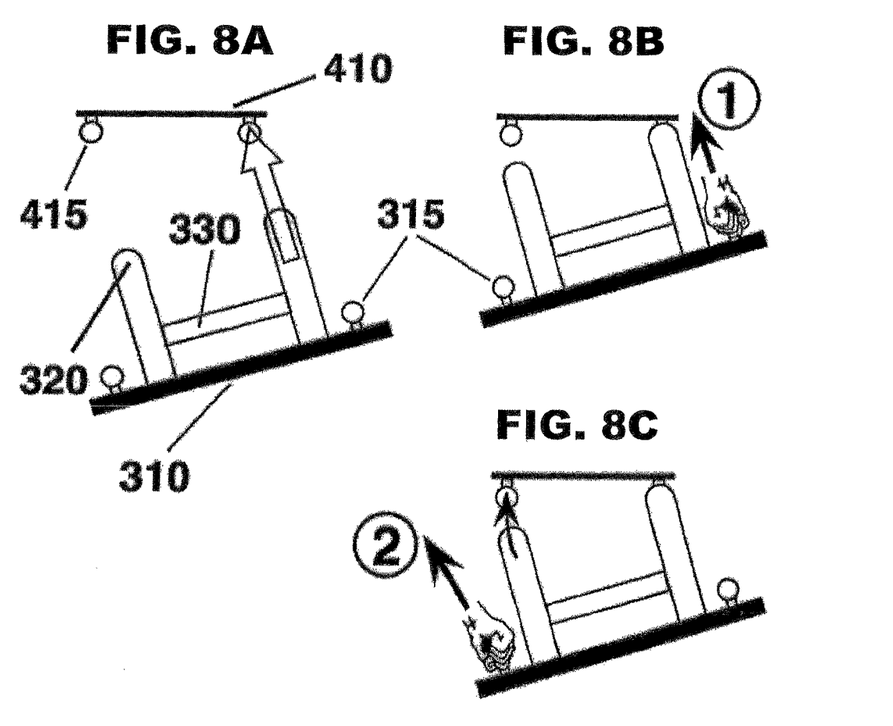
FIGS. 8A-8D and 9A-9B illustrate yet another alternative embodiment of the present disclosure.
Figure 8D:
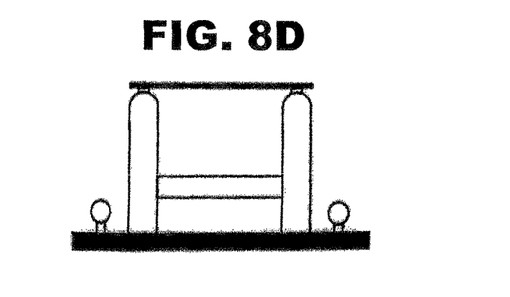
Figure 9A:
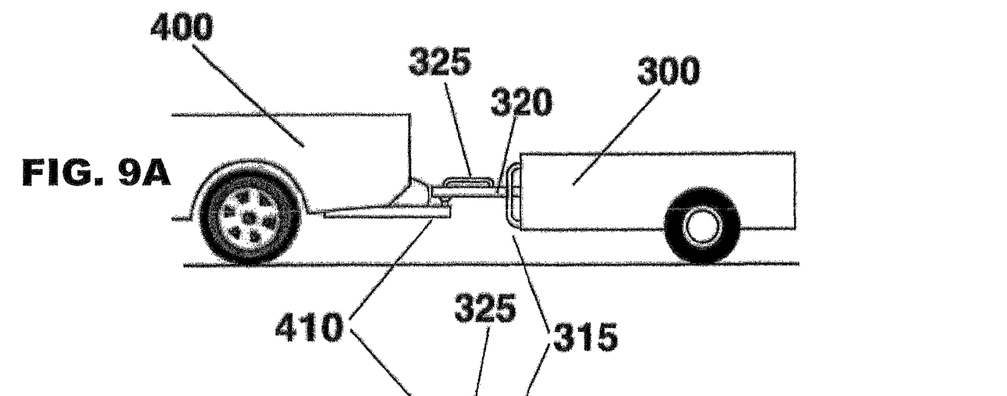
Figure 9B:
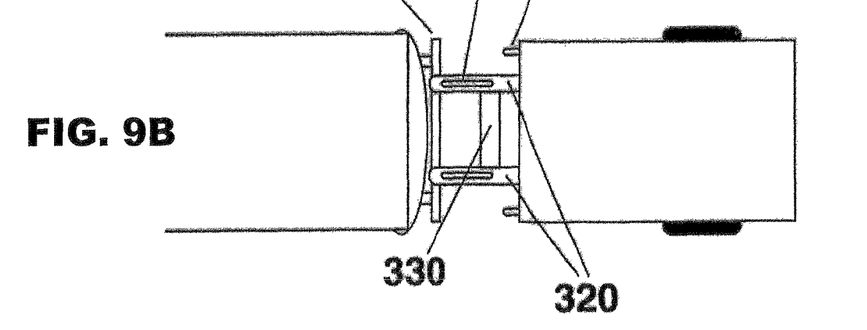

FIGS. 8 and 9 present a laterally-stable dual-hitching structure as an elaboration of the existing normal single-ball hitching method for trailers to vehicles.

FIG. 8 is a top plan view demonstrating a dual-ball hitching procedure.

FIG. 8A presents vehicle hitch frame 410 that features two hitch balls 415, and trailer hitch frame 310 that features two trailer hand grabs 315. Extending from the hitch frame are two hitching tongues with coupler connectors 320. The tongues are in assembly with tongue connective support 330. An arrow demonstrates the initial operational destination of a trailer hitching connector to a hitch ball of the vehicle 400 hitch frame.

FIG. 8B illustrates a first step of the trailer hitching process: a person's hand grabbing a trailer hand grip 325 and pulling a trailer tongue into installed connection with a vehicle hitch ball.

FIG. 8C illustrates a second step of the hitching process from the other side of the trailer 300: a hand is shown pulling the second trailer tongue toward it's destination vehicle hitch ball.

FIG. 8D presents the accomplished dual-hitched trailer attachment.

FIG. 9A-is a full side view of detail 81/FIG. 9B is a full top plan view of detail 8D.

While the disclosure has been provided in connection with wheeled range-extending trailers for electric vehicles, the disclosure advantageously may be used in connection with other general-purpose or special-purpose trailers.

DRAWINGS—Reference Numerals

100 Range-Extending Trailer
110 Trailer Housing
115 Handle
130 Trailer Swiveling Suspension Wheel
140 Trailer Swiveling Ground Maneuvering Wheel
150 Trailer Installing Plate
160 Rear Handle
170 Side Handles
200 Electric Vehicle
210 Vehicle Receiving Plate
215 Clearance Height of Receiving Plate
220 Locking Pin
222 Locking Pin Holes
230 Receiving Plate Alignment Edge
235 Receiving Plate Seating Recess
240 Installing Plate End Edge
250 Vehicle Hinged Hitch Frame
300 Trailer
310 Trailer Hitch Frame
315 Trailer Hand Grip
320 Trailer Hitching Tongue with Ball Connector
325 Tongue Hand Grip
330 Tongues Connective Support
400 Electric Vehicle
410 Trailer Hitch Frame
415 Hitch Ball
202-208 Alignment and Attachment Steps

The invention claimed is:

1. A trailer for use with a vehicle, the trailer comprising a housing having a vehicle facing side,
   an attaching plate attached to the vehicle facing side of the housing, said attaching plate being adapted for engaging with a receiving plate having a pair of angled alignment guides on the vehicle, and defining a seating recess, whereupon the attaching plate will laterally self-align to the angled alignment edges of the receiving plate into the seating recess when the trailer and/or vehicle are moved towards one another; and
   at least three wheels attached to the housing, wherein the at least three wheels includes one or more swiveling suspension wheels attached to the housing, spaced from the attaching plate, and one or more swiveling ground maneuvering wheels attached to the housing between the swiveling suspension wheels and the attaching plate,
   wherein the one or more swiveling maneuvering wheels are adapted to be raised out of the way when the trailer is hitched to the vehicle.

2. The trailer of claim 1, further including a maneuvering handle attached to the housing.

3. The trailer of claim 2, wherein the maneuvering handle is attached to a rear of the trailer.

4. The trailer of claim 2, wherein the maneuvering handle is attached to a side of the trailer.

5. The trailer of claim 1, wherein the attaching plate is sized and shaped to self align with the receiving plate on the vehicle.

6. The trailer according to claim 1, comprising two swiveling suspension wheels and one swiveling ground maneuvering wheel.

7. The trailer of claim 1, comprising one swiveling suspension wheel and two swiveling ground maneuvering wheels.

8. The trailer of claim 1, comprising two swiveling suspension wheels and two swiveling ground maneuvering wheels.

9. A system for extending a range of a motor vehicle powered by an electric motor, said system comprising a trailer as claimed in claim 1, and one or more rechargeable batteries carried on the trailer.

10. The system of claim 9, wherein the motor vehicle is selected from the group consisting of an automobile, a truck, a van, and a bus.

11. The trailer of claim 1, further comprising a battery pack configured to power a motor vehicle carried on the trailer.

12. The trailer according to claim 1, wherein the attaching plate has a general form of an inverted "J".

* * * * *